Sept. 8, 1970   E. GRABHER   3,526,938
MACHINE TOOL

Filed Sept. 11, 1967   3 Sheets-Sheet 1

ERICH GRABHER, INVENTOR

By Wenderoth, Lind & Ponack
  ATTORNEYS

Sept. 8, 1970 E. GRABHER 3,526,938
MACHINE TOOL
Filed Sept. 11, 1967 3 Sheets-Sheet 2

ERICH GRABHER INVENTOR
By, Wenderoth, Lind & Ponack,
Attorneys

Sept. 8, 1970  E. GRABHER  3,526,938
MACHINE TOOL

Filed Sept. 11, 1967  3 Sheets-Sheet 3

ERICH GRABHER, INVENTOR

By Wenderoth, Lind & Ponack,
Attorneys

United States Patent Office 3,526,938
Patented Sept. 8, 1970

3,526,938
MACHINE TOOL
Erich Grabher, Zurich, Switzerland, assignor to Oerlikon-Buhrle Holding Ltd., Zurich, Switzerland
Filed Sept. 11, 1967, Ser. No. 666,586
Claims priority, application Switzerland, Sept. 13, 1966, 13,212/66
Int. Cl. B21d 53/00
U.S. Cl. 29—1                                        4 Claims

ABSTRACT OF THE DISCLOSURE

In the case of machine tools a slide is guided on a guide portion by means of a combined roller- and slide guiding. A holding roller of the slide rolls with adjustable contact pressure of the roller, for play-free sliding of locking of the slide, on a rolling track of the guide portion in the next vicinity of a prism forming the slideways.

The rolling track is disposed at a right angle to the plane of symmetry of the said prism and its projection, parallel to said plane, meets the prism.

The distance of the rolling track from the prism represents a fraction of that of adjustable rollers on a bar of the guide portion from said prism.

---

This invention relates to a machine tool having devices for guiding a slide on a guiding portion and more specifically to a machine tool with a guide portion which comprises a pair of V-guides, a rolling track disposed horizontally and a bar with two parallel guiding surfaces situated opposite one another, and a slide which is guided for longitudinal displacement on said tracks and surfaces in that, provided on the slide are a first slideway situated opposite the V-ways, as well as a guide member situated opposite the second V-way and rollers which are adjustable parallel to their own axis and of which a first guide roller bears resiliently against one of the two guiding surfaces and a holding roller rests on the rolling track.

A machine tool of this kind is known. It is constructed in the form of a vertical boring mill and comprises, as shown in FIG. 1, a horizontal crossrail 1 as a guide portion and a spindle slide 2 guided rectilinearly for displacement on the crossrail and adapted for locking thereon with a vertically disposed boring spindle 3 as a slide.

The combined sliding and rolling guide means of this machine tool comprises, as shown in FIG. 2, a first guideway 4 which stands vertically and is mounted below the crossrail 1 and a second guideway 5 which is inclined in relation thereto. Together, the two tracks form the pair of V-ways, of which the plane of symmetry A—A is inclined to the vertical. Furthermore, the first guiding surface 6 which lies in the same vertical plane as the guideway 4, and the second guiding surface 7 extending parallel thereto, are disposed in the longitudinal direction on the crossrail 1 at the top. The bar 8 extends along the crossrail 1 between these two surfaces 6 and 7. The rolling track 9, on which there rests the holding roller 10 carrying the spindle slide 2, is mounted horizontally at the top on the bar 8.

The first slideway 4a is provided, at the bottom, on the spindle slide 2, opposite the guideway 4, and an auxiliary roller 5a bearing resiliently against the track 5 is provided as a guide member. In addition, a supporting member 12, which is adjustably secured to the spindle slide, is situated opposite and spaced apart from the track 5.

At the top of the spindle slide 2, this comprises a sliding surface 6a corresponding to the first guiding surface 6 and the first guide roller 7a associated with the second guiding surface 7.

In addition, a locking device is provided on the spindle slide 2 in order to lock it on the crossrail 1. This device comprises a locking member 11, which is displaceable horizontally, having an inclined binding surface which acts on the crossrail 1 at a corresponding binding surface 13 which is provided on the bar 8, at the top, and is inclined in the opposite direction to the second guideway 5. The spindle slide 2 is pressed against the guiding surface 6 by the horizontal component of the binding force of the locking member 11 and raised by the vertical component by the small amount of the play between the supporting member 12 and the guideway 5, that is to say the holding roller 10 is relieved as a result. In this manner, the locking of the spindle slide 2 on the crossrail 1 is brought about.

It is an object of this invention to provide a formation of the machine tool—for the sake of accuracy—that machining forces can be taken up when the slide is in the released state.

It is also an object of this invention to avoid inaccuracies developed during the positioning of the tools as a result of change in the support, of the running clearance at the supporting member and deformation in the slide.

Another object of this invention is to provide means that avoid a "tilting" of the slide in the transverse direction with respect to the crossrail.

It is an object of this invention to provide means that outwardly directed machining forces which exceed the weight of the slide, as during boring for example, would not raise the latter.

A further object of this invention is to avoid the so-called gravity play when the locking of the slide is released.

It is also an object of this invention to provide means to avoid the so-called "canting" during the longitudinal displacement, that is to say to a phenomenon which likewise detracts from the accuracy in position.

The invention means a further development and is characterised in that a guide portion for a slide is comprising a pair of V-guideways, the plane of symmetry of which is disposed at right angle to a horizontally mounted rolling track, the projection of said track parallel to said plane meets the said guideways, a bar having two parallel guiding surfaces situated opposite one another, and said slide being guided for longitudinal displacement on said guideways and guiding surfaces, including a first slideway, which is opposite one of said guideways as well as a guide member opposite the other of said guideways constructed in the form of a second slideway and rollers adjustable parallel to their own axis are mounted on said slide, of which a first guide roller bears resiliently against one of said two guiding faces, a second guide roller bears pressed against the other of said guiding surfaces, adjacent to said first guide roller against its resilience, and a holding roller rests on said rolling track, the said rolling track and the said holding roller are opposite and adjacent to said pair of guideways at a fraction of the distance of said guiding surfaces at said bar from said pair of guideways.

Such an arrangement renders it possible to execute machining operations with rotating transverse forces even during the displacement of the slide without detracting from accuracy, for example milling operations with simultaneous longitudinal feed of the spindle slide.

The reason for this progress lies, inter alia, in that a second slideway is used instead of the auxiliary roller. This slideway can now slide, together with the first slideway, against the V provided on the guide portion with a vertical plane of symmetry, being guided without clearance with initial tensioning of the mutual engagement. Through suitable dimensioning of the initial tension or of the contact pressure of the holding roller, the advantages are obtained of reliable guiding of the slide despite rotating transverse forces and the possibility of locking by increasing the contact pressure without changing the point of support. During work without feed of the spindle slide, the latter is locked to the crossrail, for example at the end of the travel into position in order that the position of the boring spindle may be retained even with the most difficult cuts. The arrangement of holding roller and its rolling track opposite to and in the immediate vicinity of the pairs of V-guides and slideways is a particular advantage because, as a result, the main forces on the slide, namely the machining and locking forces as well as the weight of the slide can be taken off at the guide portion by the shortest distance, without harmful deformation. The initial tension fundamentally avoids the raising of the slide, for example during the boring, during locking and the lowering by the amount of the gravity play during the release. In addition, the weight of the slide can be completely compensated or even over-compensated for by a permanent constant basic value of the initial tension.

The bringing together of the tracks comprising sliding friction leads to the fact that the position of the resulting total frictional resistance comes to lie entirely in the vicinity of the guideways and slideways at the bottom on the crossrail and of the point of action of the feed drive of the slide which is likewise there in the immediate vicinity. This leads to the advantages that "canting" is avoided and at the same time the necessary frictional damping is effective at the most suitable point for the reliable travel of the slide into a required position or, for example, to absorb vibrations during milling.

At the same time, at the bar at the top there is a very effective rolling guiding of the slide, which is free of play but offers little frictional resistance, against the guide surfaces which are at a distance which is a multiple of the distance of the rolling track from the pair of guideways. The second guide roller can resiliently follow the first adjustable guide roller with a roller pressure which can be adapted to the operating conditions. "Tilting" of the slide about the theoretical ridge line of the prism of the pair of slideways as a result of transverse forces is therefore no longer possible. Nevertheless, the adjustment of the first guide roller parallel to the axis permits pivoting of the slide during assembly, that is to say the boring spindle can be brought very precisely and easily into position from the beginning.

All these means favour, in a progressive manner, the working accuracy of the machine tool and the reliable locking of the slide on the guiding portion.

The machine tool already known is illustrated in FIGS. 1 and 2 of the drawing and three examples of embodiments of machine tools constructed in accordance with the invention then follow in FIGS. 3 to 8.

Figure 1:
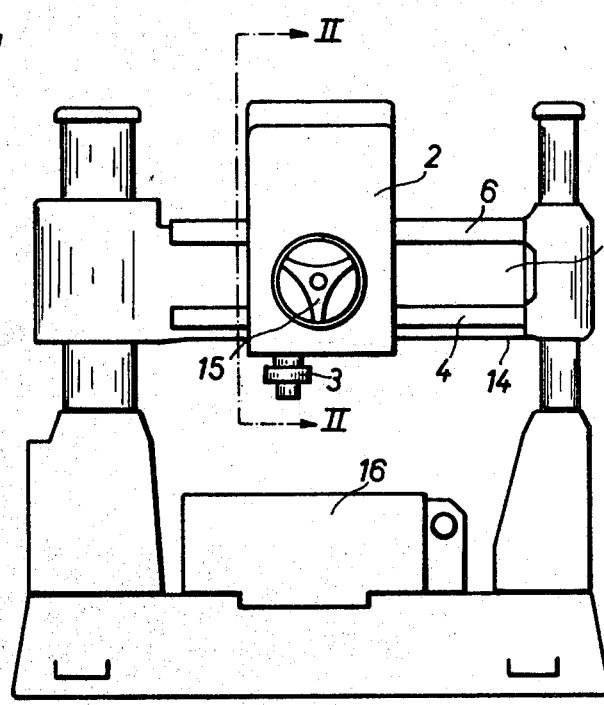
FIG. 1 shows a view of the known machine tool with its crossrail and spindle slide.
Figure 2:
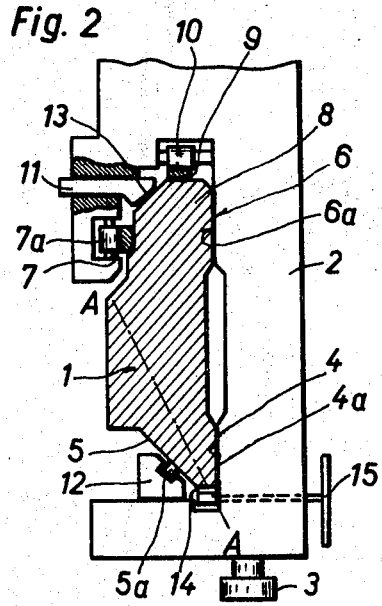
FIG. 2 shows a cross-section on the line II—II in FIG. 1 through the crossrail and the spindle slide.
Figure 3:
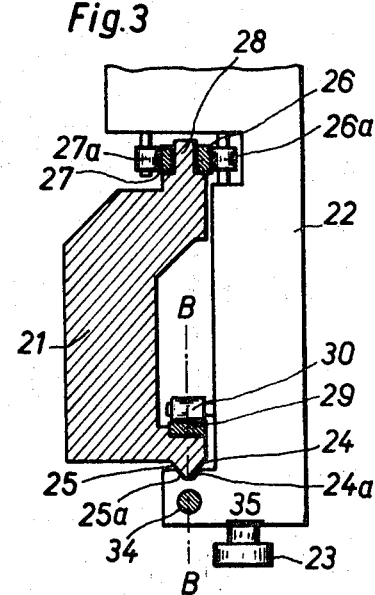
FIG. 3 shows an illustration, corresponding to FIG. 2, of the arrangement according to the invention of crossrail and spindle slide.

The machine tool according to the invention, shown as a vertical boring mill by way of example, corresponds fundamentally in construction to the kind illustrated in FIG. 1. It has certain differences, however, which are expressed in FIG. 3. The spindle slide 22, which carries the boring spindle 23, is guided for displacement perpendicular to the plane of the drawing, on the crossrail 21 as a guiding portion. The guide on the crossrail—in the form of V—is formed by the guideways 24 and 25 on the one hand, the plane of symmetry B—B of which is vertical, and on the other hand by the horizontal rolling track 29. Holding rollers, one of which, 30, is illustrated in FIG. 3, and which rest on the rolling track 29, are mounted on the spindle slide 22. The spindle slide engages under the guideways 24, 25 and is in engagement with the latter by means of the corresponding first slideway 24a and second 25a. Hereinafter, these tracks will be termed collectively "main guide means." The two vertical guiding surfaces 26 and 27 are present at the top, on the crossrail 21, on the bar 28, as further guide means for the spindle slide 22, hereinafter termed "subsidiary guide means." The guide rollers 26a and 27a which run on these surfaces are mounted with vertical axes on the spindle slide. Of these two rollers, the roller 27a corresponds to the one which is resiliently flexible parallel with its axis, while the roller 26a can be adjusted parallel with its axis.

Figure 4:
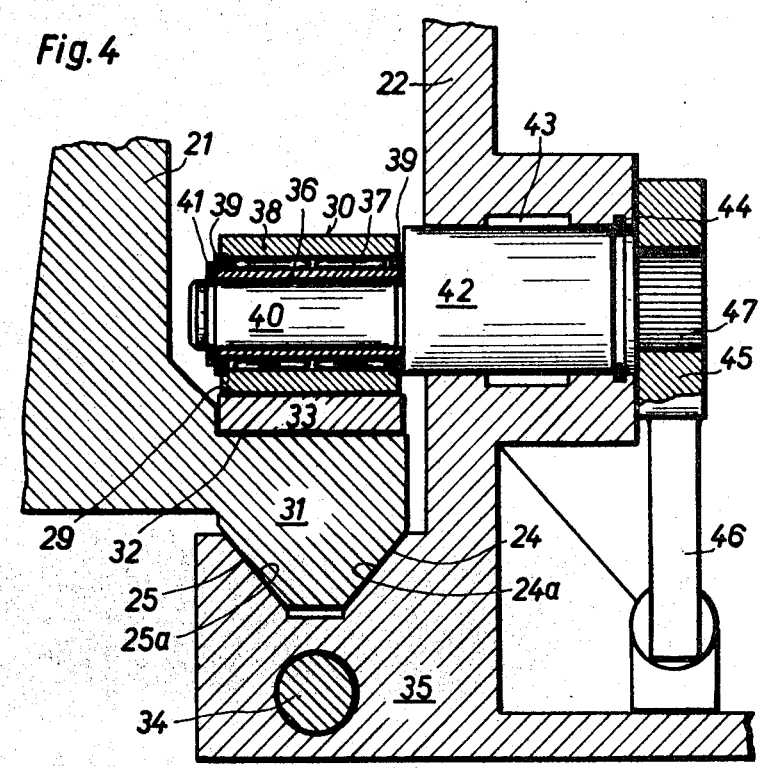
FIG. 4 shows the V-ways and slideways of FIG. 3 in cross-section but on a larger scale, together with a portion of an actuating device.

The details of the construction of the main guide means can be seen in FIG. 4. The two guideways 24, 25 are formed on a bar-shaped portion 31 of the crossrail 21 at the side of which, remote from the guideways 24, 25, there is provided a bearing shoulder 32 for an inserted bar 33, which is preferably hardened and one surface of which forms the rolling track 29. The spindle slide 22 has an under-engaging section 35 which contains the pair of slideways 24a, 25a and surrounds a drive member for the spindle slide 22, which drive member is preferably constructed in the form of a feed screw 34 for example.

In the present example in FIG. 4, the holding roller 30 is represented as a needle-roller bearing. It consists of the inner ring 36, the needles 37, the outer ring 38 which at the same time is the race, and the lateral thrust rings 39.

The holding roller 30 is mounted on a journal 40 by the inner ring 36 and secured by the locking ring 41. The journal 40 forms an extension, machined eccentrically on a shaft 42 which is mounted for rotation in a bore 43 in the spindle slide 22. A locking ring 44 serves to secure the shaft 42 against displacement. The lever 45, which is secured for adjustment with respect to the angular position of the eccentricity of the extension 40, on splines 47 which may be provided for example, is mounted on the concentric part of the shaft 42 and through it, the shaft 42 is in driving connection with an actuaitng device.

Figure 5:
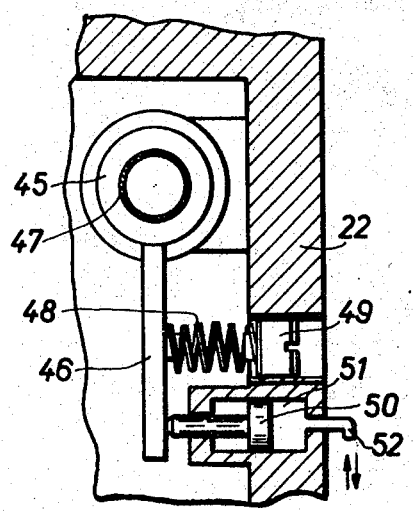
FIG. 5 shows a side view of the actuating device, partially in section.

FIG. 5 shows that this actuating device may comprise, for example, a pretensioning spring 48 and a piston 50 to which pressure medium is admitted. Both spring 48 and piston 50 act on the arm 46 transversely thereto. At the spindle-slide side, the spring 48 bears against a threaded pin 49 screwed into the wall. The piston 50 is inserted in a cylinder bore 51 in the spindle-slide wall. The pressure medium in the cylinder 51 is influenced from a pressure source through a control, neither of which is illustrated, through the line 52.

Figure 6:
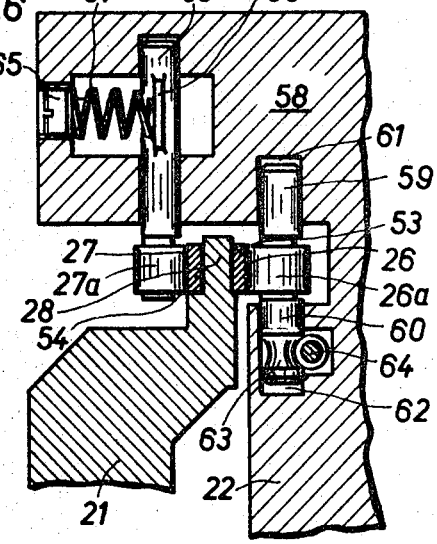
FIG. 6 shows the guiding of the spindle slide on the guiding surfaces of a bar of the crossrail as shown in FIG. 3 but on a larger scale.

With regard to the above-mentioned subsidiary guide means at the top on the cross-rail 21 and on the spindle slide 22, FIG. 6 shows that here, too, eccentrically mounted rollers are provided for the adjustment parallel of the axis. The construction of the rollers 26a and 27a may, for example, be in the same manner, in the form of needle-roller bearings, as that of the holding roller 30. Furthermore, similar to the inserted bar 33, guide bars 53, 54 with hardened running surfaces 26, 27 on which the rollers are guided, are inserted at each side of the cross-rail bar 28. The resilient flexibility of the first guide roller 27a is achieved in that the shaft 55 on which the eccentricity is machined at the projecting end, comprises a lug 56 set radially and extending parallel to the axis of the shaft. The helical spring 57 is inserted, with an initial tension adapted to guiding without play, in the overhanging profile portion 58 of the spindle slide 22, between the lug 56 and an adjustable supporting surface of the threaded stopper 65. The first guide roller 27a can thus follow the guiding surface 27 like the corresponding roller 7a the guide surface 7 in the known boring mill. As distinct from the roller 27a which is mounted at one side in the spindle slide, the adjustable second guide roller 26a is mounted for rotation in the spindle slide at both sides with the shaft portions 59 and 60 in the bores 61 and 62. The shaft portion 60 carries teeth 63 in which there engage the adjusting worm 64 likewise mounted in the spindle slide.

Figure 7:
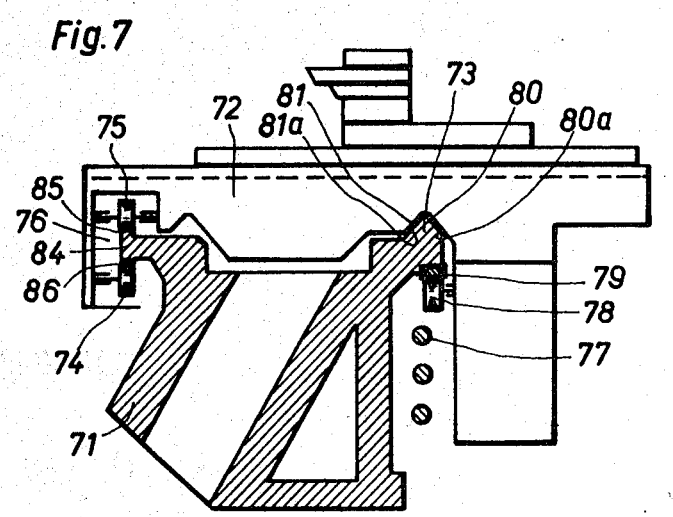
FIG. 7 shows a further example of embodiment for use on a lathe, illustrated diagrammatically in partial cross-section.
Figure 8:
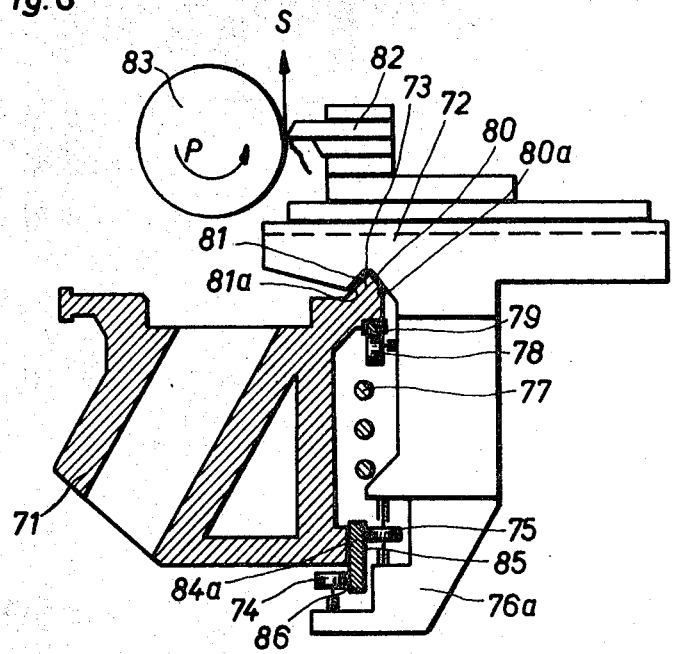
FIG. 8 shows an example of an application, likeways on a lathe, in a modified embodiment, illustrated diagrammatically partially in cross-section.

In FIGS. 7 and 8, the use of the invention is illustrated diagrammatically for the prerequisites in a lathe. The lathe bed 71 replaces the crossrail of the boring mill. The longitudinal slide 72 which is guided without play for displacement perpendicular to the plane of the drawing by the main V-guide means 73 and the two guide rollers 74, 75 of the subsidiary guide means 76, replaces the spindle slide. A leadscrew 77 may be considered for example as a drive member for this displacement. In both cases, as distinct from the arrangement in the boring mill according to the invention—the main guide means are shown in arrangement turned through 180°, that is to say the holding roller 78 and the rolling track 79 are situated below the V-ways 80, 81.

FIG. 7 illustrates a construction of the lathe with subsidiary guide means 76 mounted on the lathe bed 71 at the top rear, whereas in FIG. 8, they 76a are provided at the bottom front, without any difference occurring in principle. Here, too, an actuating device for varying the contact pressure is in driving connection with the holding roller 78, but not illustrated.

In FIG. 8 attention is additionally drawn to the fact that, in certain machining cases, forces act on the longitudinal slide 72 which originate from the cutting force S of the tool 82 during the machining of a workpiece 83 rotating in the direction of the arrow P.

As a modification in the construction of the subsidiary guide means 76a, the bar 84a on the lathe bed 71 may comprise staggered guide surfaces 85 and 86 for the rollers 74 and 75 without any disadvantage from the point of view of design, as FIG. 8 shows.

The mode of operation of the machine tool according to the invention with a combined guide and locking device is clear from the following:

During the assembly, the alignment of the boring spindle 23 with respect to the machine table 16 has to take place as soon as the spindle slide 22 is placed on the main and subsidiary guide means. For this purpose, the adjustment of the guide roller 26a is initiated by turning the adjusting worm 64 for the course adjustment in the first instance. This presupposes that the eccentricity on the shaft 59, 60 for the roller 26a is in such a position with respect to the guiding surface 26 that sufficient adjusting travel is present. Then follows the pre-adjustment of the main guide means for which purpose the guideways 24 and 25 determine the initial position. It should be possible for the contact pressure of the holding roller 30 to be varied between a binding force ensuring the reliable locking of the spindle slide 22 and zero action of force. Accordingly, the optimum angular position of the eccentricity of the journal 40 with respect to the rolling track 29 should be determined preliminarily and likewise the setting of the lever arm 46 with respect to the splines 47 on the shaft 42. Through the tensioning of the spring 48 by means of the threaded pin 49, the spindle slide 22 can be raised until the slideways 24a and 25a touch the guideways 24, 25, that is to say until the weight of the spindle slide is compensated. Since a second holding roller 30 is generally provided symmetrically with respect to the centre of the spindle slide, the same adjusting operation must also take place at this. The worm 64 is used again for the fine adjustment of the boring spindle 23 until the vertical position is reached in the plane transversely to the crossrail 21. The spring 57 is tensioned by screwing in the threaded stopper 65, as a result of which a torque develops at the shaft 55 which, as a result of the eccentric mounting of the roller 27a, presses this against the guide bar 54. The magnitude of the spring force depends on the condition that the roller 26a must not be lifted from the guiding surface 26 by the operating forces.

In the same manner, the contact pressure of the holding roller 30 is finally regulated to the necessary magnitude by varying the tension of the spring 48 through turning the threaded pin 49. The condition that the spindle slide 22 can be displaced without play under every operating force determines the magnitude of the tension. A pressure on the piston 50 is additionally used for locking the spindle slide to the crossrail 21. The necessary selection of said force for the locking is effected by regulation and control of the pressure medium in the cylinder 51 through the pipeline 52. In this case, the mechanically stressing flow of force in the material of the walls and the like in crossrail and spindle slide extends over the shortest path from the bearings of the shaft 42 through the holding roller 30 through the inserted bar 35 through the bearing shoulder 32 into the bar-shaped prism portion 31 of the crossrail through the guideways and slideways 24, 25, 24a, 25a to the under-engaging section 35 of the spindle slide, which latter contains the bearing arrangement for the shaft 42. Here the circuit is closed again.

The circulation of the forces at the subsidiary guide means is similarly short, and therefore also has extremely little deformation effect and is free from binding force for the locking. The contact pressure of the roller 27a passes through the guide bar 54 to the bar 28, the bar 53, the roller 26a and, divided by the shaft portions 59 and 60, to the overhanging section 58 in which the shaft 55 is mounted. Thus here, too, the flow of force is closed over the shortest paths.

The extent of the distance between the main guide means and subsidiary guide means is of particular importance for the precise adjustment of the setting of the boring spindle 23. Expressed more precisely, this means that the rolling track 29 and the holding roller 30 are mounted, at only a fraction of the distance of the guiding surfaces of the subsidiary guide from the ridge line of the prism of the guide ways, which line theoretically acts as a pivotal axis for the whole spindle slide during the adjustment, away from this line. For practical conditions, this traction amounts to substantially one fifth to one quarter.

In the examples shown in FIGS. 7 and 8, the weight of the longitudinal slide 72 together with the parts mounted thereon ensures the mutual engagement of the guideways and slideways 80, 81; 80a, 81a at the main guide means 73. Normally, the operating forces of a lathe mutilply this effect. There are cases of machining however, in which upwardly directed forces S may exceed the weight of the slide 72 and would raise it without the counteraction of the holding roller 78 (FIG. 8). In addition, the holding roller 78 exerts an additional contact pressure as soon as the locking of the slide 72 on the lathe bed 71 becomes necessary. The actuating device, not illustrated here, may, as for the boring mill, be adapted for actuation automatically, by remote-control or, in certain circumstances, purely mechanically.

I claim:

1. A machine tool comprising a horizontal guide portion, guideways running longitudinally along said guide portion comprising a main guideway and a side guideway, a side displaceable and lockable on said main guideway, said main guideway comprising a first slideway pair which forms a prism set on said guide portion, a second slideway pair forming a counter prism with said prism engaging and set on said slide, both of said prisms having a common ridge line and a plane of symmetry with said ridge line which bisects the angle of said prisms and stands vertically, said main guideway comprising also a flat rolling plane set on said guide portion longitudinally and at a right angle to said plane of symmetry and the geometric projection of said rolling plane parallel to said plane of symmetry meets the said guideway pairs, a guiding and clamping roller resting on said rolling plane and set in said slide displaceable to said rolling plane, actuating means for displacing said guiding and clamping roller producing through displacement of said guiding and clamping roller an adjustable bearing load and clamping force when engaging of said prisms takes place, said latter force clamping said slide onto said main guideway, said side guideway being set at a greater distance from said ridge line than the distance of said rolling plane from said ridge line, said side guideway having two parallel faces set across from each other at said guide portion, a first and a second guide roller rolling on one of each of said faces at a time and being displaceably set in said slide and means for swinging said slide around said ridge line by displacing both of said guide rollers.

2. A machine tool according to claim 1 wherein activating means are provided comprising a pivot pin set in said slide on which is excentrically disposed said guide roller and said clamping roller, a lever arm radially disposed connected to said pivot pin and a source of power engaging said lever arm exerting a torsional moment on said pivot pin for generating said bearing load and clamping forces.

3. A machine tool according to claim 2 wherein said power source comprise a prestressed spring element on said pin producing said torsional moment of such a size of said bearing load whereby at least a drop clearance of said slide in both said slideway pairs is compensated and an additional force guided by means of pressure causing an additional torsional moment which secures said clamping force for locking said slide.

4. A machine tool according to claim 1, wherein said means for displacing both said guiding rollers comprise an adjustable pin, which is set on both sides in said slide and onto which is excentrically adjusted the first of said guide rollers, a worm drive acting upon said adjustable pin through rotation, an additional pin set unilaterally in said slide and onto which is excentrically adjusted the second of said guide rollers, a further prestressed spring element, whereby said additional pin is subjected to a torque exerted on it by said spring element, said torque being resisted passing over said second guide roller and both said faces on said first guide roller.

References Cited

UNITED STATES PATENTS 3,377,711   4/1968   Wempe _____ 308—3

JOHN F. CAMPBELL, Primary Examiner

R. J. CRAIG, Assistant Examiner

U.S. Cl. X.R.

269—55; 308—3